United States Patent
Tandon et al.

(10) Patent No.: US 7,811,359 B2
(45) Date of Patent: Oct. 12, 2010

(54) COMPOSITE MEMBRANE FOR SEPARATION OF CARBON DIOXIDE

(75) Inventors: Kunj Tandon, Bangalore (IN); Umakant Rapol, Bangalore (IN); Ullash Kumar Barik, Orissa (IN); Rajappan Vetrivel, Bangalore (IN)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 11/624,326

(22) Filed: Jan. 18, 2007

(65) Prior Publication Data

US 2008/0173179 A1     Jul. 24, 2008

(51) Int. Cl.
*B01D 53/22*     (2006.01)
*B01D 71/70*     (2006.01)

(52) U.S. Cl. ............ 95/51; 95/45; 95/54; 95/139; 96/4; 96/11; 96/13; 96/14; 210/640; 210/500.28; 210/500.41; 55/523; 55/524

(58) Field of Classification Search .......... 95/45, 95/51, 54, 139; 96/4, 11, 12, 13, 14; 210/640, 210/641, 500.21, 500.27, 500.28, 500.41; 55/523, 524

See application file for complete search history.

(56) References Cited

U.S. PATENT DOCUMENTS

| | | | |
|---|---|---|---|
| 4,187,390 A | | 2/1980 | Gore |
| 4,533,369 A | * | 8/1985 | Okita ............ 96/12 |
| 4,551,156 A | | 11/1985 | Li et al. |
| 4,581,043 A | * | 4/1986 | van der Scheer ........ 95/51 |
| 4,631,075 A | | 12/1986 | Yamabe et al. |
| 4,664,669 A | * | 5/1987 | Ohyabu et al. ........ 55/524 |
| 4,764,560 A | * | 8/1988 | Mitchell ............ 96/6 |
| 4,781,733 A | * | 11/1988 | Babcock et al. ........ 95/51 |
| 4,781,907 A | * | 11/1988 | McNeill ............ 95/51 |
| 4,933,082 A | | 6/1990 | Yamada |
| 4,945,125 A | * | 7/1990 | Dillon et al. ........ 524/427 |
| 5,042,992 A | | 8/1991 | Blinka et al. |
| 5,049,167 A | | 9/1991 | Castro et al. |
| 5,061,301 A | | 10/1991 | Kim et al. |
| 5,104,425 A | | 4/1992 | Rao et al. |
| 5,181,940 A | | 1/1993 | Bikson et al. |
| 5,242,636 A | | 9/1993 | Sluma et al. |

(Continued)

FOREIGN PATENT DOCUMENTS

EP     0107636 A1     5/1984

(Continued)

OTHER PUBLICATIONS

Powell, Clem E. et al. Polymeric CO2/n2 gas separation membranes for the capture of carbon dioxide from power plant flue gases. Journal of Membrane Science, Feb. 17, 2006, 1-49, V-279, Elsevier B.V.

(Continued)

*Primary Examiner*—Jason M Greene
(74) *Attorney, Agent, or Firm*—GE Global Patent Operation; Catherine J. Winter

(57) ABSTRACT

A membrane and method for separating carbon dioxide from a mixture of gases, where the membrane includes expanded polytetrafluoroethylene and polysiloxane. The membrane is highly stable and can separate carbon dioxide at high flux in harsh environments and high temperatures, such as exhaust gases from power plants.

25 Claims, 2 Drawing Sheets

U.S. PATENT DOCUMENTS

| | | | |
|---|---|---|---|
| 5,259,950 | A | 11/1993 | Shiro et al. |
| 5,332,424 | A | 7/1994 | Rao et al. |
| 5,336,298 | A | 8/1994 | Quinn et al. |
| 5,356,461 | A | 10/1994 | Sluma et al. |
| 5,443,728 | A | 8/1995 | Macheras et al. |
| 5,464,798 | A | 11/1995 | Jia et al. |
| 5,595,658 | A | 1/1997 | Fritsch et al. |
| 5,641,332 | A | 6/1997 | Faber et al. |
| 5,753,009 | A | 5/1998 | Sirkar et al. |
| 5,753,011 | A | 5/1998 | Sircar et al. |
| 5,850,833 | A | 12/1998 | Kotliar |
| 5,943,859 | A | 8/1999 | Kawamura |
| 6,017,474 | A | 1/2000 | Teo et al. |
| 6,140,263 | A | 10/2000 | Anstett et al. |
| 6,152,991 | A | 11/2000 | Ackley |
| 6,197,091 | B1 | 3/2001 | Ji et al. |
| 6,221,131 | B1 | 4/2001 | Behling et al. |
| 6,235,377 | B1 | 5/2001 | Dillon et al. |
| 6,306,491 | B1 | 10/2001 | Kram et al. |
| 6,315,968 | B1 | 11/2001 | Quinn et al. |
| 6,425,936 | B1 | 7/2002 | Sammons et al. |
| 6,454,836 | B1 | 9/2002 | Koelmel et al. |
| 6,478,857 | B2 | 11/2002 | Czabala |
| 6,508,860 | B1 | 1/2003 | Kulkarni et al. |
| 6,620,472 | B1 * | 9/2003 | Shepard et al. ............... 96/11 |
| 6,626,980 | B2 * | 9/2003 | Hasse et al. .................. 95/51 |
| 6,663,805 | B1 | 12/2003 | Ekiner et al. |
| 6,681,648 | B1 | 1/2004 | Dye et al. |
| 6,716,275 | B1 | 4/2004 | Reed et al. |
| 7,255,792 | B2 * | 8/2007 | Livington ..................... 95/45 |
| 2002/0045041 | A1 * | 4/2002 | Dillon et al. ........... 428/311.51 |
| 2002/0062737 | A1 | 5/2002 | Guiver et al. |
| 2003/0084786 | A1 | 5/2003 | Chau et al. |
| 2003/0168407 | A1 | 9/2003 | Kusakabe et al. |
| 2004/0033370 | A1 | 2/2004 | Chau et al. |
| 2004/0077075 | A1 | 4/2004 | Jensen |
| 2004/0149127 | A1 | 8/2004 | Lyons et al. |
| 2004/0173094 | A1 | 9/2004 | Nakayama et al. |
| 2004/0182242 | A1 | 9/2004 | Mitani et al. |
| 2004/0213985 | A1 | 10/2004 | Lee et al. |
| 2005/0026134 | A1 | 2/2005 | Miller et al. |
| 2005/0087491 | A1 | 4/2005 | Hennige et al. |
| 2005/0103193 | A1 | 5/2005 | Lyons et al. |
| 2005/0139066 | A1 | 6/2005 | Miller et al. |
| 2005/0202307 | A1 | 9/2005 | Zhang et al. |
| 2005/0284294 | A1 * | 12/2005 | Lou et al. ..................... 96/11 |
| 2006/0016332 | A1 | 1/2006 | Ma et al. |
| 2006/0034757 | A1 | 2/2006 | Yan et al. |
| 2006/0144239 | A1 | 7/2006 | Suzuki et al. |

FOREIGN PATENT DOCUMENTS

| | | | |
|---|---|---|---|
| EP | 0175668 | A1 | 3/1986 |
| EP | 0337499 | A2 | 10/1989 |
| EP | 0144054 | B1 | 5/1990 |
| EP | 0447971 | A2 | 9/1991 |
| EP | 0480039 | A1 | 4/1992 |
| EP | 0526857 | A1 | 2/1993 |
| EP | 0343284 | B1 | 3/1993 |
| EP | 0617996 | A1 | 10/1994 |
| EP | 0254556 | B1 | 11/1994 |
| EP | 0446471 | B1 | 3/1995 |
| EP | 0506701 | B1 | 3/1995 |
| EP | 0674939 | A2 | 10/1995 |
| EP | 0597300 | B1 | 9/1996 |
| EP | 0674938 | B1 | 11/1998 |
| EP | 0908219 | A1 | 4/1999 |
| EP | 1144099 | B1 | 3/2003 |
| EP | 1442783 | A2 | 8/2004 |
| EP | 1575114 | A2 | 9/2005 |
| GB | 2138702 | A | 10/1984 |
| GB | 2397303 | A | 7/2004 |
| GB | 2397821 | A | 8/2004 |
| JP | 07254128 | A2 | 10/1966 |
| JP | 58008514 | A2 | 1/1983 |
| JP | 58223411 | A2 | 12/1983 |
| JP | 59000301 | A2 | 1/1984 |
| JP | 59066308 | A2 | 4/1984 |
| JP | 60129119 | A2 | 7/1985 |
| JP | 60139316 | A2 | 7/1985 |
| JP | 62136224 | A2 | 6/1987 |
| JP | 62136225 | A2 | 6/1987 |
| JP | 63049220 | A2 | 3/1988 |
| JP | 63141625 | A2 | 6/1988 |
| JP | 63182017 | A2 | 7/1988 |
| JP | 63264101 | A2 | 11/1988 |
| JP | 63264122 | A2 | 11/1988 |
| JP | 63270525 | A2 | 11/1988 |
| JP | 63291809 | A2 | 11/1988 |
| JP | 63296821 | A2 | 12/1988 |
| JP | 63296822 | A2 | 12/1988 |
| JP | 01030620 | A2 | 2/1989 |
| JP | 01155929 | A2 | 6/1989 |
| JP | 01242123 | A2 | 9/1989 |
| JP | 01245036 | A2 | 9/1989 |
| JP | 02009430 | A2 | 1/1990 |
| JP | 02139023 | A2 | 5/1990 |
| JP | 02218423 | A2 | 8/1990 |
| JP | 02222718 | A2 | 9/1990 |
| JP | 03038225 | A2 | 2/1991 |
| JP | 03042020 | A2 | 2/1991 |
| JP | 03193124 | A2 | 8/1991 |
| JP | 03262523 | A2 | 11/1991 |
| JP | 03284320 | A2 | 12/1991 |
| JP | 06246143 | A2 | 9/1994 |
| JP | 08071385 | A2 | 3/1996 |
| JP | 09094448 | A2 | 4/1997 |
| JP | 9-202615 | | 8/1997 |
| JP | 09313903 | A2 | 12/1997 |
| JP | 10036113 | A2 | 2/1998 |
| JP | 10036114 | A2 | 2/1998 |
| JP | 01-288315 | | 11/1999 |
| JP | 2005305371 | A2 | 11/2005 |
| WO | 94/29002 | A1 | 12/1994 |
| WO | 95/08360 | A1 | 3/1995 |
| WO | 96/37176 | A1 | 11/1996 |
| WO | 99/43416 | A1 | 9/1999 |
| WO | 99/45035 | A1 | 9/1999 |
| WO | 99/45036 | A1 | 9/1999 |
| WO | 01/97957 | A1 | 12/2001 |
| WO | 02/38258 | A1 | 5/2002 |
| WO | 03/093406 | A2 | 11/2003 |
| WO | 2004/016729 | A2 | 2/2004 |
| WO | 2005/063362 | A1 | 4/2005 |
| WO | 2005/113121 | A1 | 12/2005 |
| WO | 2006/037022 | A2 | 4/2006 |

OTHER PUBLICATIONS

Yeom, C.K. et al, Study of transport of pure and mixed CO2/N2 gases though polymeric membranes. Journal of Applied Polymer Science, 2000, p. 179-189, V78, John Wiley & Sons, Inc.

Merkel, T.C. et al Ultrapermeable reverse-selective nanocomposite membranes. Science Apr. 19, 2002, p. 519-522, V296.

Nakagawa, Tsutomu, et al. Morphology and gas permeability in copolyimides containing polydimethylsiloxane block. Journal of Membrane Science, Jul. 13, 2001, p. 149-163, V206, Elsevier B.V.

Pechar, Todd W. et al. Preparation and characterization of a poly(imide siloxane) and zeolite L mixed matrix membrane. Journal of Membrane Science, Oct. 22, 2005, p. 1-9, Elsevier B.V.

Tokarski, John S. et al. Molecular modelling off polymers 17. Simulation and QSPR analyses of transport behavior in amorphous polymeric material. Computational and Theoretical Polymer Science, 1997, p. 199-214, V7 Elsevier Science LTD. Great Britain.

Stern, S.A, & Frisch, H.L. The selective permeation of gases through polymers. Annual Reviews. Material Science. Nov. 1981, p. 523-550, National Chemical Laboratory.

Pasternak, R.A. et al. Diffusion and solubility of simple gases through a copolymer of a hexafluoropropylene and tetrafluoroethylene. Stanford Research Institute, Feb. 22, 1971, p. 470, California.

Pasternak, R.A. et al. Diffusion and permeation of oxygen, nitrogen, carbon dioxide, and nitrogen dioxide through polytetrafluoroethylene. Stanford Research Institute, Dec. 19, 1969. p. 366. California.

Strathman, Heiner, et al. Development of Synthetic membrane for gas and vapor separation. Pure and Appl. Chemicals, 1986, p. 1663-1668, V58, IUPAC, Great Britain.

Senthilkumar, U. et al. Gas permeation and sorption properties of non-ionic and cationic amino-hydroxy functionalized poly(dimethylsiloxane) membranes. Journal of Membrane Science, Dec. 13, 2004, p. 1-9 Elsevier B.V.

Ouyang, M. UV-ozone induced growth of a SiOx surface layer on a cross-linked polysiloxane film: characterization and gas separation properties. Journal of Membrane Science, May 17, 2000, p. 177-187, V177, Elsevier Science B.V.

Damen, Kay, et al. A comparison of electricity and hydrogen production systems with CO2 capture and storage. Part A: Review and selection of promising conversion and capture technologies. Process in Energy and Combustion Science, Jan. 20, 2006, p. 215-246, V32, Elseiver Ltd.

Moaddeb, Maryam, & Koros, William J. Silica-treated ceramic substrates for formation of polymer-ceramic composite membranes. Ind. Eng. Chem. Res. 1995, p. 263, V34, America Chemical Society.

Hinchliffe, Anthony B. & Porter, Kenneth E. Gas separation using membranes. 1. Optimization of the separation process using new cost parameters. Ind. Eng. Chem. Res. 1997, p. 821-829, V36, America Chemical Society.

Clarizia, G. et al. Filler-polymer combination: a route to modify gas transport properties of a polymer membrane. Polymer, Jun. 2, 2004, p. 5671-5681, V45, Elsevier Ltd.

Huijgen, W.J.J.& Comans, R.N.J. Carbon dioxide sequestration by mineral carbonation. ENC- Clean fossil fuels environmental risk assessment. Feb. 2003, p. 1-52.

Bredesen, Rune et al. High-temperature membranes in power generation with CO2 capture. Chemical Engineering and Processing, May 25, 2004, p. 1129-1158, V43, Elsevier B.V.

Gu, Xuehong et al. Synthesis of defect-free FAU-type zeolite membranes and separation for dry and moist CO2/N2 mixtures. Ind. Eng. Chem. Res. 2005, p. 937-944, V44, American Chemical Society.

Lin, Haiqing et al. High-performance polymer membranes for natural-gas sweetening. Advanced Materials, 2006, p. 39-44, V18, Wiley-VCH Verlag GmbH & Co.

Wong, Sam & Bioletti, Rob. Carbon dioxide separation technologies, Carbon & Energy Management, 2002 p. 1-14, Alberta Research Council.

Noble, Richard D. et al. CO2 separations using zeolite membranes. University of Colorado, 2001 p. 1-3.

Park, Ho Bum et al. Effect of a UV/Ozone treatment on siloxane-containing copolyimides: Surface modification and gas transport characteristics, Chemical Material, May 9, 2003, p. 2346-2353, V15, American Chemical Society.

Hagg, May-Britt, Membrane purification of Cl2 gas I. Permeabilities as a function of temperature for Cl2, O2, N2, H2 in two types of PDMS membranes. Journal of Membrane Science, 2000, p. 173-190, V170, Elsevier Science B.V.

Merkel, T.C. et al, Gas sorption, diffusion, and permeation in poly(dimethysiloxane). Journal of Polymer Science: Part B Polymer Physics, 2000, p. 415-434, V38, John Wiley & Sons, Inc.

Merkel, T.C. et al. Mixed-gas permeation of syngas components in poly(dimethylsiloxane) and poly(1-trimethylsily-1-propyne) at elevated temparatures. Journal of Membrane Science, Apr. 16, 2001, p. 85-94, V191, Elsevier Science B. V.

Roualdes, Stephanie et al. Gas separation properties of organosilicon plasma polymerized membranes. Materials, Interfaces, and Electrochemical Phenomena, Jul. 1999, p. 1566-1575, No. 7, AIChE Journal.

Keller, Klaus et al. Carbon dioxide sequestion: when and how much? Jan. 2, 2003 p. 1-36.

Highly Selective Hydrongen Separation zeolite membranes for coal gasification membrane reactor applications. NETL Hydogen Project, Office of Coal & Environmental Systems, p. 1-2.

Separation and Capture of carbon dioxide, Carbon Sequestration Research and Development, Section 2, p. 1-14.

International Energy Outlook 2004, Office of Intergrated Analysis and forecasting, US Department of Energy, p. 137-158.

* cited by examiner

COMPOSITE MEMBRANE FOR SEPARATION OF CARBON DIOXIDE

FIELD OF THE INVENTION

The field of the invention relates to composite membranes and more particularly, to membranes for separating carbon dioxide.

BACKGROUND OF THE INVENTION

Fossil fuel based power plants emit carbon dioxide, which is a greenhouse gas. Exhaust gases include up to about 15 percent by volume carbon dioxide, which is required to be isolated from the other gaseous components to reduce the exhaust of greenhouse gases. Other gaseous components may include nitrogen, oxygen and water vapor.

A currently practiced method to capture carbon dioxide involves chemical absorption in an amine solution. When gaseous components are bubbled through an amine solution, the acidic carbon dioxide alone is absorbed by the alkaline amine solution. Later, the absorbed carbon dioxide is released by a thermal process. This process is environmentally unfriendly, costly and requires a large area.

Conventionally, polymeric membranes have been used in gas separation. Thin polymeric membranes lead to a high flux of gas at low pressures. However, the strength of polymeric membranes limits the usable gas pressures and thereby, the flux through the membranes. Also, polymeric membranes may not hold up to the harsh environment and high temperatures of exhaust gas from power plants.

EP Publication No. 0254556 discloses a semipermeable thin film membrane of siloxane oligomers or copolymers for acid gas separation from hydrocarbon gases. The membrane may be formed on a microporous polymer support. As a material, siloxane has the advantage of high permeability to gas molecules and a good selectivity. However, the mechanical properties of siloxane are too poor to impart structural stability.

What is needed is a highly stable membrane for separating carbon dioxide from mixed gases at high flux, at high temperatures and in a harsh environment.

SUMMARY OF THE INVENTION

In one embodiment, a membrane for separating carbon dioxide from a mixture of gases comprising carbon dioxide, wherein the membrane comprises expanded polytetrafluoroethylene and polysiloxane.

In another embodiment, a method for separating carbon dioxide from a gas mixture comprising carbon dioxide, wherein the method comprises feeding the gas mixture through a membrane comprising expanded polytetrafluoroethylene and polysiloxane.

The various embodiments provide a highly stable membrane for separating carbon dioxide from mixed gases at high flux in harsh environments and high temperatures, such as exhaust gases from power plants. The membrane has high strength, good selectivity and high tear strength.

DETAILED DESCRIPTION OF THE INVENTION

Figure 1:
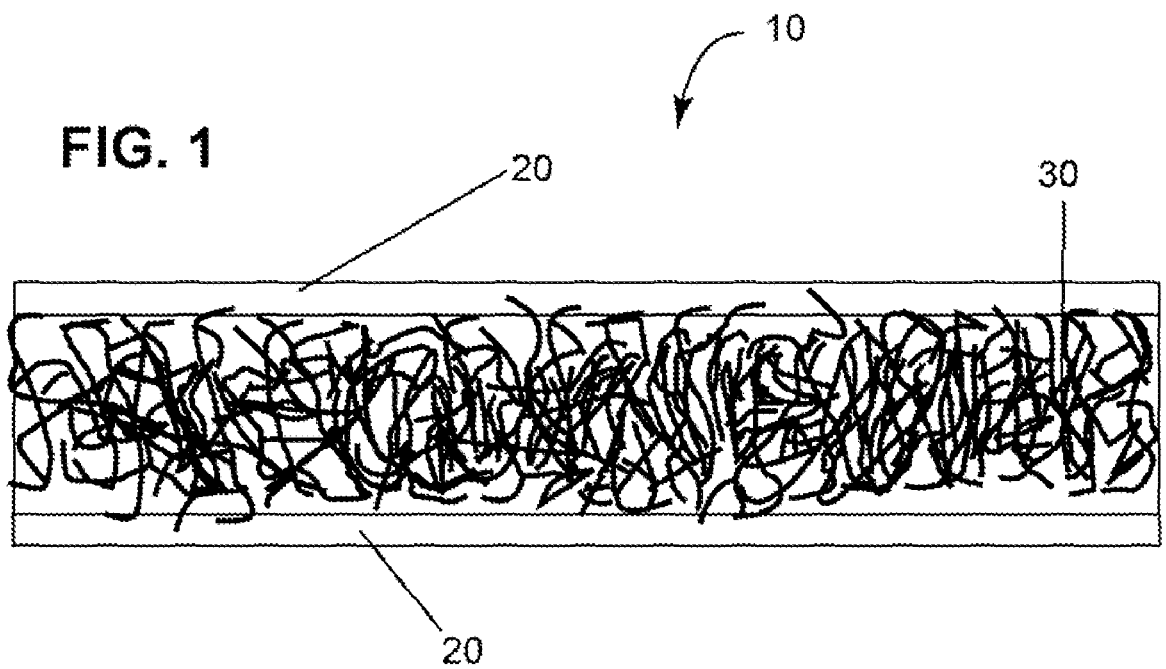
FIG. 1 is an exemplary embodiment depicting a composite membrane structure.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a membrane for separating carbon dioxide from a mixture of gases comprising carbon dioxide, wherein the membrane comprises expanded polytetrafluoroethylene and polysiloxane.

The mixture of gases may be exhaust gases from coal fired power plants. In one embodiment, the mixture of gases may comprise carbon dioxide and nitrogen. In another embodiment, the mixture of gases may comprise carbon dioxide and oxygen. In another embodiment, the mixture of gases may comprise carbon dioxide, nitrogen and oxygen. In one embodiment, the mixture of gases comprises from about 3 to about 15 percent by volume carbon dioxide, from about 70 to about 90 percent by volume nitrogen and from about 1 to about 15 percent by volume oxygen. The mixture may also contain other gases, such as water vapor, argon or sulfur dioxide.

Expanded polytetrafluoroethylene is an expanded form of polytetrafluoroethylene that is substantially more porous and stronger than polytetrafluoroethylene. Expanded polytetrafluoroethylene is prepared by stretching polytetrafluoroethylene in one or more directions between 35° C. and 327° C. at a rate exceeding about 10 percent per second. Methods for making expanded polytetrafluoroethylene is described in U.S. Pat. No. 3,953,566, which is incorporated herein by reference. Expanded polytetrafluoroethylene membranes may be obtained commercially.

The polysiloxane may be any type of polysiloxane. In one embodiment, the polysiloxane is a polyorganosiloxane. In another embodiment, the polyorganosiloxane is crosslinked. The polyorganosiloxane is reacted with a crosslinker and catalyst.

The polyorganosiloxane may be linear or branched. In one embodiment, the polyorganosiloxane has the formula:

$$MD_qT_sM$$

wherein:
M is $R^2{}_aR^3{}_{3-a}SiO_{1/2}$;
D is $R^4{}_2SiO_{2/2}$;
T is $R^5SiO_{3/2}$;
$R^2$ is an alkoxy, aryloxy or araalkoxy containing from 1 to 60 carbon atoms, including 1 to 30 carbon atoms; $R^3$, $R^4$ and $R^5$ are each independently alkyl, aryl or aralkyl containing from one to sixty carbon atoms, including one to 30 carbon atoms and one to 10 carbon atoms; q and s are each independently integers from 0 to 300 and a is an integer from 1-3. In another embodiment q and s are each independently integers from 0 to 50 and in another embodiment, q and s are each independently integers from 0 to 20.

In one embodiment, the polyorganosiloxane has a viscosity in the range of from about 10 centistokes to about 1,000,000 centistokes. The viscosity of the polyorganosiloxane includes ranges having an upper limit of about 1,000,000 centistokes, about 500,000 centistokes, about 100,000 centistokes, about 10,000 centistokes, about 1000 centistokes, about 500 centistokes, about 250 centistokes and about 120 centistokes. The viscosity of the polyorganosiloxane includes ranges having a lower limit of about 10 centistokes, about 50 centistokes, about 90 centistokes, about 250 centistokes, about 500 centistokes, about 1000 centistokes, about 10,000 centistokes and about 100,000 centistokes. The lower limit amounts and the upper limit amounts are independently combinable to create ranges usable in the practice of the present invention. The viscosity is measured by Brookfield DV-II or HAAKE RheoStress 600 at 25° C.

In one embodiment, the polysiloxane is a linear or branched hydroxyl-terminated polydimethylsiloxane.

The crosslinker may be any type of crosslinker suitable for crosslinking siloxanes including N-propyl silicate, tetraethylorthosilicate, tetrafutylorthosilicate, tri-functional silanes, such as trialkyl silanes and tetra-functional silanes, such as tetraalkyl silanes. The alkyl groups may be methyl, ethyl, propyl, butyl, pentyl, hexyl, heptyl, octyl, nonyl and decyl. In one embodiment, the crosslinker is N-propyl silicate. The cross-linkers are added in quantities ranging from about 0.2 to about 5.0 equivalents of polysiloxane.

The catalyst may be any type of curing catalyst, including dibutyltin oxide and dibutyl tin oxide and dialkyl metal salts of carboxylic acid, such as dibutyl tin dilaurate and dibutyl tin diadipate. In one embodiment, the catalyst is a dibutyl tin oxide. The catalysts are added in quantities ranging from 0.2 to 5.0 equivalents of polysiloxane.

The crosslinker, polysiloxane and catalyst may be reacted in any conventional manner. The order of reactants is not essential and the reactants may be added in any order. The crosslinker and catalyst are used in equimolar amounts.

The polysiloxane may be crosslinked at any temperature suitable for curing polysiloxanes. In one embodiment, the polysiloxane may be cured from about room temperature to about 70° C. In another embodiment, the polysiloxane is cured at room temperature.

The membrane may be a composite structure comprising more than one layer. In one embodiment, the membrane comprises three layers. In one embodiment, the membrane comprises an active layer and two support layers. In another embodiment, the membrane comprises an active layer sandwiched between two support layers.

The support layer provides support to the membrane structure and is permeable to gases. The thickness of the support layers should be thick enough to support the membrane and thin enough to allow a high flux of gas through the membrane. In one embodiment, each support layer is in a range of from about 10 microns to about 50 microns. In another embodiment, each support layer is in a range from about 20 microns to about 40 microns. In another embodiment, each support layer is about 25 microns.

The active layer is more permeable to carbon dioxide than to nitrogen or oxygen and separates the carbon dioxide from the mixed gases. The thickness of the active layer should be thick enough to provide suitable selectivity for the membrane and thin enough to allow a high flux of gas through the membrane. In one embodiment, the active layer is in a range of from about 10 microns to about 600 microns. In another embodiment, the active layer is in a range from about 100 microns to about 500 microns. In another embodiment, the active layer is about 500 microns.

In one embodiment, each support layer comprises expanded polytetrafluoroethylene and the active layer comprises polysiloxane. In another embodiment, the membrane comprises an active layer comprising polysiloxane sandwiched between two layers comprising expanded polytetrafluoroethylene.

The layers of the composite membrane are applied in any conventional manner. In one embodiment, the layers are applied by spraying, brushing, rolling, pouring, immersing, coating or by assembling preformed layers. In one embodiment, the composite membrane is prepared by applying a support layer to each side of an active layer. In another embodiment, an active layer is applied to a support layer by pouring the active layer material onto the support layer. In another embodiment, a polyorganosiloxane active layer is applied to an expanded polytetrafluoroethylene support layer by pouring the polyorganosiloxane on an expanded polytetrafluoroethylene and applying a second expanded polytetrafluoroethylene support layer to the active polysiloxane layer and curing or crosslinking the polyorganosiloxane to the support layers. The crosslinked polyorganosiloxane layer has strong adhesion to each support expanded polytetrafluoroethylene layer providing a strong and highly stable membrane for harsh environments.

An exemplary embodiment is shown in FIG. 1. A composite membrane 10 comprises two support layers 20 and an active layer 30. The support layers 20 comprise expanded polytetrafluoroethylene and are each about 25 microns thick. Active layer 30 comprises crosslinked polydimethylsiloxane and is about 500 microns thick. The support layers 20 provide stability to the composite membrane 10. Mixed gases (not shown) will readily pass through the support layers 20. The active layer 30 is more permeable to carbon dioxide and separates the carbon dioxide from the remaining mixture of gases. Carbon dioxide readily passes through the composite membrane and can then be diverted for sequestration or further processing. The remaining mixed gases do not pass through the active layer 30 and can be released to the atmosphere or diverted for additional processing.

In another embodiment, a method for separating carbon dioxide from mixed gases comprising at least carbon dioxide, wherein the method comprises feeding the gas mixture through a membrane comprising expanded polytetrafluoroethylene and polysiloxane.

The active layer may further comprise a porous ceramic to enhance the selectivity of the polysiloxane by modulating the pore diameter of the active layer. The ceramic comprises any type of ceramic. In one embodiment, the ceramic comprises zeolite, $Al_2O_3$, $Y_2O_3$, MgO, $SiO_2$, $Si_3N_4$ or $ZrO_2$. In another embodiment, the ceramic comprises zirconia or zeolites.

Zeolites are porous materials with pore diameters ranging from about 0.1 nm to 5.0 nm. The diameters can further be adjusted by incorporating metal ions inside the pores as exchangeable cations. In another embodiment, the zeolites are zeolite-A, ZSM-5 and zeolite Beta with exchanged metal ions, where the metal ions are alkali and alkaline earth metal ions, including sodium, potassium, lithium and rubidium.

The ceramic may be combined with the polysiloxane by mixing the ceramic with the polysiloxane to form a slurry that can be formed into an active layer. In one embodiment, the ceramic is mixed with the polysiloxane at a concentration of from about 10 to less than 65 percent by volume. In another embodiment, the ceramic is mixed with the polysiloxane in a range of from about 10 to about 60 percent by weight based on the weight of the polysiloxane.

In one embodiment, the pores of the membrane are suitable to achieve a separation factor of carbon dioxide to nitrogen from about 10 to about 100. In another embodiment, the separation factor is greater than 10. In one embodiment, the average pore size in the active layer is about 0.1 to about 1.0 nm. In another embodiment, the average pore size is from about 0.1 to about 2 nm.

Assembled membrane structures may be fitted in the exhaust from power plants or in the exhaust of gas or coal fired turbines.

In order that those skilled in the art will be better able to practice the present disclosure, the following examples are given by way of illustration and not by way of limitation.

EXAMPLES

Example 1

A composite membrane was prepared by using two extended polytetrafluoroethylene (ePTFE) membranes from BHA Technologies and hydroxyl-terminated polydimethylsiloxane (PDMS) obtained from Gelest® having a viscosity of about 90-120 cSt. The PDMS was crosslinked with an equimolar mixture of N-propyl silicate and dibutyl tin oxide. PDMS was mixed with the N-propyl silicate and the dibutyl tin oxide in polymer cups and mixed by hand.

Two heavy glass slabs were used as support for the e-PTFE membranes. One e-PTFE membrane was wrapped snug on a glass slab. Four spacers of 0.5 mm thickness were placed on the wrapped e-PTFE membrane to control the thickness of the PDMS layer. The PDMS crosslinking mixture was poured on to the wrapped e-PTFE membrane at a thickness of 500 microns The other glass slab with the wrapped membrane was placed on top of the spacer after the PDMS slurry was poured onto the lower glass slab. The upper glass slab was lifted off a few minutes later. The membrane was left to cure at room temperature for 8 hours.

The cured membrane was cut into circular disks of having a diameter of 7 cm for permeability measurements. Permeability properties were determined using a constant pressure/variable volume apparatus shown in FIG. 2. The composite membrane 200 was assembled onto a steel mesh 210 in a pressure cell 220. The pressure cell 220 comprises a gas input 230 for the mixed gas comprising carbon dioxide and an output 240 for the separated carbon dioxide gas. The mixed gas contacts the composite membrane 200. The carbon dioxide continues through the membrane 200 and out the output 240. The upstream pressure was varied between 2 to 3.5 bars, while maintaining the downstream pressure at 0.91 bar. A soap film bubble flow meter was used to measure the gas flow rates. Prior to the measurements, the upstream chamber was purged with the permeant gas. The measured rate of flow of $N_2$ and $CO_2$ gases through the membrane is shown in Table 1. Permeability was determined for individual gases when steady state condition was reached.

TABLE 1

Measured rate of flow of gas through the membrane in the pressure cell for a membrane area of about 35.4 cm$^2$

| | | Membrane | | |
|---|---|---|---|---|
| Example | Gas | Feed Pressure Bar | Permeate Pressure Bar | Gas Flow cc/min |
| 1 | $N_2$ | 4.9 | 0.91 | 0.005 |
| | $CO_2$ | 4.9 | 0.91 | 0.055 |

TABLE 1-continued

Measured rate of flow of gas through the membrane in the pressure cell for a membrane area of about 35.4 cm$^2$

| | | Membrane | | |
|---|---|---|---|---|
| Example | Gas | Feed Pressure Bar | Permeate Pressure Bar | Gas Flow cc/min |
| 2 | $N_2$ | 3.9 | 0.91 | 0.0041 |
| | $CO_2$ | 3.9 | 0.91 | 0.044 |
| 3 | $N_2$ | 5.9 | 0.91 | 0.0046 |
| | $CO_2$ | 5.9 | 0.91 | 0.0542 |

From the rate of gas flow, the permeability of individual gases is calculated to be 6200 Barrers for $CO_2$ and 600 Barrers for $N_2$. The permeability measured for $CO_2$ and $N_2$ shows a selectivity of greater than 10 for carbon dioxide over nitrogen. Oxygen has a similar permeability as nitrogen and thus, the membrane shows a selectivity of greater than 10 for carbon dioxide over nitrogen and for carbon dioxide over oxygen.

Figure 3:
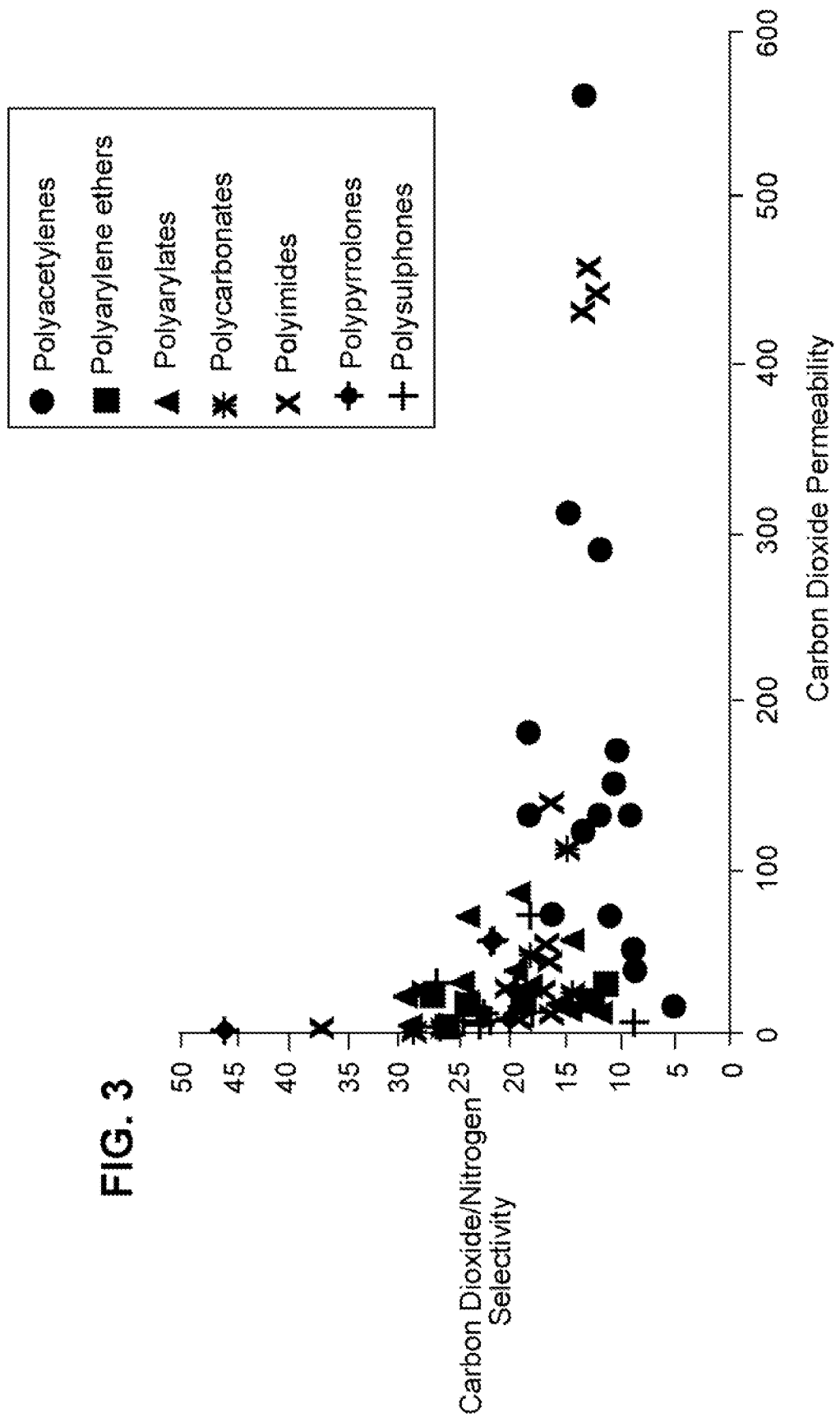
FIG. 3 is a graph showing selectivity and permeability for several membranes.

FIG. 3 is from data published in an article: Powell, Clem E. & Qiao, Greg G. (2006), Journal of Membrane Science 279, 1-49. FIG. 3 shows carbon dioxide permeabilities and selectivity for several types of membranes, such as polyacetylene, polyarylene ether, polyarylate, polycarbonate, polyimide, polypyrrolone and polysulphone. The carbon dioxide permeabilities for the polymeric membranes are much lower (by about a factor of 10) than the carbon dioxide permeability in the present example. This leads to an enhanced flux of gas and a reduction in the area of the membrane needed.

Mechanical properties of this membrane were measured and are shown in Table 2 and are compared with an ePTFE membrane and a PDMS membrane. PDMS by itself, does not have enough mechanical strength to measure mechanical properties.

TABLE 2

| Sample | Tensile Stress at Max Load (ksi) | Tensile Modulus (ksi) | Tensile Elongation (%) | Mullen Strength (psi) | Air Permeability (cfm) |
|---|---|---|---|---|---|
| Example 1 | 3.33 (MD) 6.06 (XD) | 7.54 (MD) 15.049 (XD) | 61 (MD) 48.20 (XD) | 32 | Not air permeable |
| ePTFE membrane | 1.54 (MD) 3.52 (XD) | 0.774 (MD) 11.186 (XD) | 280 (MD) 59 (XD) | 18 | 0.4-0.55 |
| PDMS membrane | — | — | — | — | — |

MD is machine direction.
XD is cross direction.

The Example 1 composite membrane has more mechanical and hydrostatic strength showed hydrostatic strength, increased tensile strength and modulus, is not permeable to air and has a reduced MD tensile elongation.

Example 2

A composite membrane was prepared by using two extended polytetrafluoroethylene (ePTFE) membranes from BHA Technologies and hydroxyl-terminated polydimethylsiloxane (PDMS) obtained from Gelest® having a viscosity of about 500,000 cSt. The PDMS was crosslinked with an equimolar mixture of N-propyl silicate and dibutyl-tin-oxide.

PDMS was mixed with the N-propyl silicate and the dibutyl tin oxide in polymer cups and mixed by hand.

Two heavy glass slabs were used as support for the e-PTFE membranes. One e-PTFE membrane was wrapped snug on a glass slab. Four spacers of 0.5 mm thickness were placed on the wrapped e-PTFE membrane to control the thickness of the PDMS layer. The crosslinking mixture PDMS was poured on to the wrapped e-PTFE membrane at a thickness of the 500 microns. The other glass slab with the wrapped membrane was placed on top of the spacer after the PDMS slurry was poured onto the lower glass slab. The upper glass slab was lifted off a few minutes later. The membrane was left to cure at room temperature for 8 hours.

The cured membrane was cut into circular disks of having a diameter of 7 cm for permeability measurements. Permeability properties were determined using a constant pressure/variable volume apparatus shown in FIG. 2. The upstream pressure was varied between 2 to 3.5 bars, while maintaining the downstream pressure at 0.91 bar. A soap film bubble flow meter was used to measure the gas flow rates. Prior to the measurements, the upstream chamber was purged with the permeant gas. The measured rate of flow of $N_2$ and $CO_2$ gases through the membrane is shown in Table 1. Permeability was determined for individual gases when steady state condition was reached.

From the rate of gas flow, the permeability of individual gases is calculated to be 2368 Barrers for $CO_2$ and 226 Barrers for $N_2$. The permeability measured for $CO_2$ and $N_2$ shows a selectivity of 10 for carbon dioxide over nitrogen.

Example 3

A composite membrane was prepared by using two extended polytetrafluoroethylene (ePTFE) membranes from BHA Technologies and hydroxyl-terminated polydimethylsiloxane (PDMS) obtained from Gelest® having a viscosity of about 90-120 cSt. The PDMS was crosslinked with an equimolar mixture of N-propyl silicate and dibutyl-tin-oxide. PDMS was mixed with the N-propyl silicate and the dibutyl tin oxide in polymer cups and mixed by hand. This is mixed with 11.8 g of beta-Zeolite. A uniform slurry mixture was formed using a planetary mixer.

Two heavy glass slabs were used as support for the e-PTFE membranes. One e-PTFE membrane was wrapped snug on a glass slab. Four spacers of 0.5 mm thickness were placed on the wrapped e-PTFE membrane to control the thickness of the slurry mixture layer. The slurry mixture was poured onto the wrapped e-PTFE membrane at a thickness of 500 microns. The other glass slab with the wrapped membrane was placed on top of the spacer after the slurry mixture was poured onto the lower glass slab. The upper glass slab was lifted off a few minutes later. The membrane was left to cure at room temperature for 8 hours.

Figure 2:
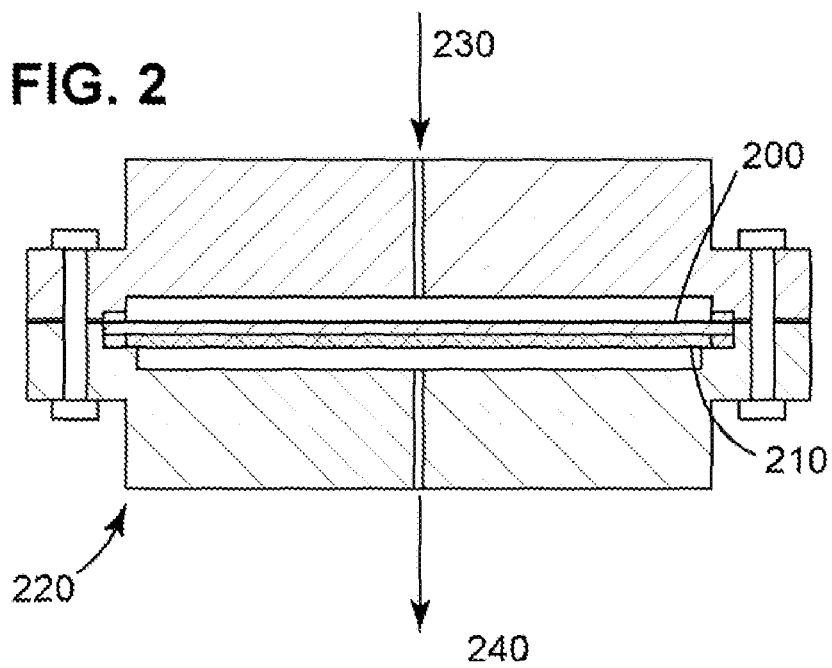
FIG. 2 is a test pressure cell housing a membrane.

The cured membrane was cut into circular disks having a diameter of 7 cm for permeability measurements. Permeability properties were determined using a constant pressure/variable volume apparatus as shown in FIG. 2. The upstream pressure was varied between 4.9 to 5.9 bars, while maintaining the downstream pressure at 0.91 bar. A soap film bubble flow meter was used to measure the gas flow rates. Prior to the measurements, the upstream chamber was purged with the permeant gas. The measured rate of flow of $N_2$ and $CO_2$ gases through the membrane is shown in Table 1. Permeability was determined for individual gases when steady state condition was reached.

From the rate of gas flow, the permeability of individual gases is calculated to be 1850 Barrers for $CO_2$ and 156 Barrers for $N_2$. The permeability measured for $CO_2$ and $N_2$ shows a selectivity of greater than 10 for carbon dioxide over nitrogen. The addition of the zeolite improves the thermal stability while maintaining a good selectivity and good permeability.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

Having described the invention, that which is claimed is:

1. A membrane for separating carbon dioxide from a mixture of gases comprising carbon dioxide, wherein the membrane comprises expanded polytetrafluoroethylene and polysiloxane and further comprises two support layers and an active layer.

2. The membrane of claim 1 wherein the mixture of gases comprises carbon dioxide and nitrogen.

3. The membrane of claim 1 wherein the polysiloxane is a polyorganosiloxane having the formula:

$$MD_qT_sM$$

wherein:
M is $R^2{}_aR^3{}_{3-a}SiO_{1/2}$;
D is $R^4{}_2SiO_{2/2}$;
T is $R^5SiO_{3/2}$, 
$R^2$ is an alkoxy, aryloxy or araalkoxy having from 1 to 60 carbon atoms; $R^3$, $R^4$ and $R^5$ are each independently alkyl, aryl or aralkyl having from one to sixty carbon atoms; q and s are each independently integers from 0 to 300 and a is an integer from 1 to 3.

4. The membrane of claim 3 wherein the polyorganosiloxane has a viscosity in the range of from about 10 centistokes to about 1,000,000 centistokes.

5. The membrane of claim 3 wherein the polyorganosiloxane is a linear hydroxyl-terminated polydimethylsiloxane.

6. The membrane of claim 1, wherein the active layer is sandwiched between the two support layers.

7. The membrane of claim 6, wherein the support layers comprise expanded polytetrafluoroethylene and the active layer comprises polysiloxane.

8. The membrane of claim 7 wherein the support layers have a thickness in the range of from about 10 microns to about 50 microns.

9. The membrane of claim 7 wherein the active layer has a thickness in the range of from about 10 microns to about 600 microns.

10. The membrane of claim 7 wherein the active layer further comprises a porous ceramic.

11. The membrane of claim 10 wherein the ceramic is selected from the group consisting of zeolite, $Al_2O_3$, $Y_2O_3$, MgO, $SiO_2$, $Si_3N_4$ or $ZrO_2$.

12. The membrane of claim 1 wherein the membrane has a permeability of greater than 4000 barrers for carbon dioxide.

13. A method for separating carbon dioxide from a gas mixture comprising carbon dioxide, wherein the method comprises feeding the gas mixture through a membrane comprising expanded polytetrafluoroethylene and polysiloxane, wherein said membrane further comprises two support layers and an active layer.

14. The method of claim 13 wherein the mixture of gases comprises carbon dioxide and nitrogen.

15. The method of claim 13 wherein the polysiloxane is a polyorganosiloxane having the formula:

$$MD_qT_sM$$ 

wherein:

M is $R^2_a R^3_{3-a} SiO_{1/2}$;

D is $R^4_2 SiO_{2/2}$;

T is $R^5 SiO_{3/2}$, $R^2$ is an alkoxy, aryloxy or araalkoxy having from 1 to 60 carbon atoms; $R^3$, $R^4$ and $R^5$ are each independently alkyl, aryl or aralkyl having from one to sixty carbon atoms; q and s are each independently integers from 0 to 300 and a is an integer from 1 to 3.

16. The method of claim 15 wherein the polyorganosiloxane has a viscosity in the range of from about 10 centistokes to about 1,000,000 centistokes.

17. The method of claim 15 wherein the polyorganosiloxane is a linear hydroxyl-terminated polydimethylsiloxane.

18. The method of claim 13, wherein the active layer is sandwiched between the two support layers.

19. The method of claim 18, wherein the support layers comprise expanded polytetrafluoroethylene and the active layer comprises polysiloxane.

20. The method of claim 18 wherein the support layers have a thickness in the range of from about 10 microns to about 50 microns.

21. The method of claim 18 wherein the active layer has a thickness in the range of from about 10 microns to about 600 microns.

22. The method of claim 18 wherein the active layer further comprises a porous ceramic.

23. The method of claim 22 wherein the ceramic is selected from the group consisting of zeolite, $Al_2O_3$, $Y_2O_3$, MgO, $SiO_2$, $Si_3N_4$ or $ZrO_2$.

24. The method of claim 13 wherein the membrane has a permeability of greater than 4000 barrers for carbon dioxide.

25. A membrane for separating carbon dioxide from a mixture of gases comprising carbon dioxide, wherein the membrane comprises two support layers each comprising expanded polytetrafluoroethylene and an active layer comprising polysiloxane, wherein the active layer is sandwiched between the two support layers.

* * * * *

UNITED STATES PATENT AND TRADEMARK OFFICE
CERTIFICATE OF CORRECTION

PATENT NO. : 7,811,359 B2
APPLICATION NO. : 11/624326
DATED : October 12, 2010
INVENTOR(S) : Tandon et al.

It is certified that error appears in the above-identified patent and that said Letters Patent is hereby corrected as shown below:

On Title Page 2, Item (56), under "OTHER PUBLICATIONS",
Line 2, delete "though" and insert -- through --, therefor.

On Title Page 3, Item (56), under "OTHER PUBLICATIONS",
Line 27, delete "Elseiver" and insert -- Elsevier --, therefor.

On Title Page 3, Item (56), under "OTHER PUBLICATIONS",
Line 38, delete "Intergrated" and insert -- Integrated --, therefor.

In Column 7, Line 57 delete " $R^2{}_a R^3{}_{3-a}, SiO_{1/2};$ " and insert -- $R^2{}_a R^3{}_{3-a} SiO_{1/2};$ --, therefor.

In Column 3, Line 23, delete "tetrafutylorthosilicate," and insert -- tetrabutylorthosilicate, --, therefor.

In Column 5, Line 33, delete "microns" and insert -- microns. --, therefor.

In Column 8, Line 27, in Claim 3, delete " $R^5 SiO_{3/2},$ " and insert -- $R^5 SiO_{3/2};$ --, therefor.

In Column 9, Line 4, in Claim 15, delete " $R^5 SiO_{3/2},$ " and insert -- $R^5 SiO_{3/2};$ --, therefor.

Signed and Sealed this
Tenth Day of April, 2012

David J. Kappos
*Director of the United States Patent and Trademark Office*